June 2, 1959 J. J. SARDELLA 2,888,736
TRANSISTOR PACKAGES
Filed March 31, 1955
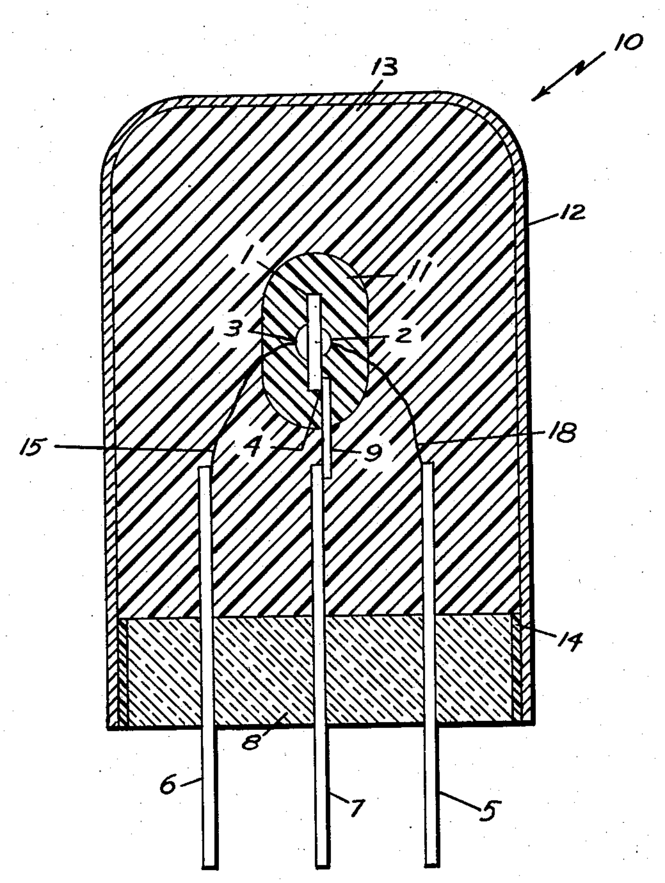
INVENTOR
JOHN J. SARDELLA
BY Elmer J. Gorn
ATTORNEY

United States Patent Office 2,888,736

Patented June 2, 1959

2,888,736

TRANSISTOR PACKAGES

John J. Sardella, Jamaica Plain, Mass., assignor to Raytheon Manufacturing Company, Waltham, Mass., a corporation of Delaware Application March 31, 1955, Serial No. 498,184

2 Claims. (Cl. 29—25.3)

This invention relates generally to electrical translation devices of the type employing a semiconductive body as an essential element, and more particularly to an improved package and method of packaging such devices.

A translating device of the type to which this invention pertains may comprise a crystal of semiconductive material, for example, germanium or silicon, having associated therewith a plurality of conducting electrodes. In one form, the device may be what is now commonly known as a junction-type transistor in which the body of semiconductive material is provided with areas exhibiting different electrical conductivity characteristics, and electrical connections made thereto to form emitter, collector, and base electrodes. At present these devices are subject to the disadvantage that their shelf life is not as long as would be desirable. During the useful life of the units the initial gain often becomes reduced, and the output current lowered. Sometimes the electrical characteristics of the devices suffer erratic variations from day to day, obviously an undesirable feature when any extensive commercial application is contemplated. It is believed that these unwanted changes in the electrical characteristics are due chiefly to the influence of heat, atmospheric vapors, and gases upon the semi-conductive material both during the fabrication processes, and after the unit has finally been packaged. In this respect, moisture seeping into the package and excessive heat incident to presently employed packaging methods have been found to be major offenders.

Accordingly, the present invention is directed to an improved protective package and method of packaging such devices wherein no excessive heat is used during the fabrication process, and wherein the path by which moisture can enter the unit is lengthened with the result that the useful lifetime of such devices is greatly extended.

The invention will be better understood as the following description proceeds, taken in conjunction with the accompanying drawing wherein the single figure illustrates a packaged transistor in accordance with the invention.

Referring now to the drawing, there is shown generally at 10 a transistor comprising a body of semiconductive material, such as germanium, having an emitter connection 2, a collector connection 3, and a base connection 4. Although a junction-type transistor in which, as is well known in the art, the semi-conductor chip 1, after suitable cutting, lapping, and etching operations, may be provided with an emitter 2 and a collector 3 by fusing an appropriate impurity element into opposite sides of the chip as shown in the drawing, it should be understood that the invention is equally applicable in making a point-contact transistor or a crystal diode.

In fabricating transistor 10, a set of conducting leads 5, 6, and 7 are insulatedly sealed in a stem-base 8, which may be glass. The semiconductor body 1 may then be mounted on the stem-base 8 by attaching base tab 9 to lead 7, as by soldering, appropriate connections also being made from emitter 2 to lead 5, and from collector

3 to lead 6 through wires 18 and 15, respectively. The chip 1, and associated emitter 2, collector 3, and base 4 may then be coated with a protective plastic covering 11, such as polyethene.

After the chip 1 has been so coated it may then be inserted into a metallic casing 12. The casing 12 is first filled to a predetermined level with a suitable casting resin 13, for example, an epoxy resin compound. Stem-base 8, the edge of which has been coated with a thick layer of suitable cold-set adhesive, which may also be of the epoxy resin variety, is then force-fitted into casing 12, as by means of an arbor-press device, making sure that some of the adhesive 14 is forced out of the package thus assuring a tight seal. The unit is then allowed to stand at room temperature for about twenty-four hours, during which time both the internal casting resin, and the cold-set adhesive become fully cured. If desired, an additional two-hour cure at about 45° C. may be employed to further insure a completed curing schedule.

It can thus be seen that a simple, improved transistor package has been provided, the fabrication of which requires the use of no heat above room temperature thus eliminating adverse effects on the heat-sensitive semiconductor body 1. In addition, the metallic casing 12 completely protects the unit against moisture absorption from the top and both sides thereby lengthening the path between the transistor and the point where moisture could conceivably enter the package.

Although there has been described what is considered to be a preferred embodiment of the present invention various adaptations and modifications thereof may be made without departing from the spirit and scope of the invention as defined in the appended claims.

What is claimed is:

1. The method of packaging a semiconductive device said method comprising attaching a set of conducting leads to a semiconductive body said leads being embedded in a stem-base, placing a quantity of a resinous substance into a metallic casing, coating the edge of said stem-base with a cold-set adhesive material, force-setting said stem-base into said casing, and curing said adhesive material whereby a tight seal between said casing and said stem-base is achieved.

2. The method of packaging a semiconductive device said method comprising attaching a set of conducting leads to a semiconductive body said leads being embedded in a stem-base, enveloping said body in a plastic material, placing a quantity of a resinous substance into a metallic casing, coating the edge of said stem-base with a cold-set adhesive material, force-setting said stem-base into said casing, and curing said adhesive material whereby a tight seal between said casing and said stem-base is achieved.

References Cited in the file of this patent

UNITED STATES PATENTS

| | | |
|---|---|---|
| 2,586,609 | Burke | Feb. 19, 1952 |
| 2,595,475 | McLaughlin | May 6, 1952 |
| 2,686,279 | Barton | Aug. 10, 1954 |
| 2,688,110 | Domaleski et al. | Aug. 31, 1954 |
| 2,704,340 | Baird | Mar. 15, 1955 |
| 2,720,617 | Sardella | Oct. 11, 1955 |
| 2,745,045 | Ingraham | May 8, 1956 |
| 2,758,261 | Armstrong et al. | Aug. 7, 1956 |
| 2,766,410 | Slade | Oct. 9, 1956 |
| 2,809,332 | Sherwood | Sept. 8, 1957 |
| 2,844,769 | Erkelens et al. | July 22, 1958 |

OTHER REFERENCES

Slade et al.: Abstract 223,547, published September 8, 1953.